(12) United States Patent
Steinman et al.

(10) Patent No.: US 6,704,817 B1
(45) Date of Patent: Mar. 9, 2004

(54) COMPUTER ARCHITECTURE AND SYSTEM FOR EFFICIENT MANAGEMENT OF BI-DIRECTIONAL BUS

(75) Inventors: Maurice B. Steinman, Marlborough, MA (US); Richard E. Kessler, Shrewsbury, MA (US); Gregg A. Bouchard, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 09/652,323

(22) Filed: Aug. 31, 2000

(51) Int. Cl.$^7$ .......................... G06F 13/00; G06F 3/00; G06F 13/14
(52) U.S. Cl. ..................... 710/100; 710/305; 710/300; 710/52
(58) Field of Search .................. 710/100, 300, 710/305, 52

(56) References Cited

U.S. PATENT DOCUMENTS

| | | | |
|---|---|---|---|
| 5,261,066 A | 11/1993 | Jouppi et al. | 395/425 |
| 5,317,718 A | 5/1994 | Jouppi | 395/425 |
| 5,500,830 A * | 3/1996 | Okabayashi | 365/230.01 |
| 5,649,217 A * | 7/1997 | Yamanaka et al. | 710/52 |
| 5,758,183 A | 5/1998 | Scales | 395/825 |
| 5,761,729 A | 6/1998 | Scales | 711/148 |
| 5,787,480 A | 7/1998 | Scales et al. | 711/148 |
| 5,802,585 A | 9/1998 | Scales et al. | 711/154 |
| 5,809,450 A | 9/1998 | Chrysos et al. | 702/186 |
| 5,875,151 A | 2/1999 | Mick | 365/233 |
| 5,890,201 A | 3/1999 | McLellan et al. | 711/108 |
| 5,893,931 A | 4/1999 | Peng et al. | 711/206 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A | 9/1999 | Scales et al. | 711/148 |
| 5,964,867 A | 10/1999 | Anderson et al. | 712/219 |
| 5,983,325 A | 11/1999 | Lewchuk | 711/137 |
| 6,000,044 A | 12/1999 | Chrysos et al. | 714/47 |
| 6,070,227 A | 5/2000 | Rokicki | 711/117 |
| 6,085,300 A | 7/2000 | Sunaga et al. | 711/168 |
| 6,412,030 B1 * | 6/2002 | Adusumilli | 710/33 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A Logic Design Structure For LSI Testability*, E. B. Eichelberger et al., 1977 IEEE (pp. 462–468).
*Direct RDRAM* ™*256/288–Mbit (512K×16/18×32s)*, Preliminary Information Document DL0060 Version 1.01 (69 p.).
*Testability Features of AMD–K6* ™ *Microprocessor*, R. S. Fetherston et al., Advanced Micro Devices (8 p.).
*Hardware Fault Containment in Scalable Shared–Memory Multiprocessors*, D. Teodosiu et al., Computer Systems Laboratory, Stanford University (12 p.), 1977.
*Cellular Disco: resource management using virtual clusters on shared–memory multiprocessors*, K. Govil et al., 1999 ACM 1–58113–140–2/99/0012 (16 p.).
*Are Your PLDs Metastable?*, Cypress Semiconductor Corporation, Mar. 6, 1997 (19 p.).
*Rambus® RIMM*™*Module (with 128/144Mb RDRAMs)*, Preliminary Information, Document DL0084 Version 1.1 (12 p.).
*Direct Rambus* ™ *RIMM* ™ *Module Specification Version 1.0*, Rambus Inc., SL–0006–100 (32 p.), 2000.
*End–To–End Fault Containment In Scalable Shared–Memory Multiprocessors*, D. Teodosiu, Jul. 2000 (148 p.).

* cited by examiner

Primary Examiner—Tim Vo

(57) ABSTRACT

An efficient system and method for managing reads and writes on a bi-directional bus to optimize bus performance while avoiding bus contention and avoiding read/write starvation. In particular by intelligently managing reads and writes on a bi-directional bus, bus latency can be reduced while still ensuring no bus contention or read/write starvation. This is accomplished by utilizing bus streaming control logic, separate queues for reads and writes, and a simple 2 to 1 mux.

32 Claims, 2 Drawing Sheets

11 Cycles

R = read
W = write
X = bubble

7 Cycles

COMPUTER ARCHITECTURE AND SYSTEM FOR EFFICIENT MANAGEMENT OF BI-DIRECTIONAL BUS

CROSS-REFERENCE TO RELATED APPLICATIONS

This application relates to the following commonly assigned applications entitled:

"Apparatus And Method For Interfacing A High Speed Scan-Path With Slow-Speed Test Equipment," Ser. No. 09/653,642, filed Aug. 31, 2000; "Priority Rules For Reducing Network Message Routing Latency, " Ser. No. 09/652,322, filed Aug. 31, 2000; "Scalable Directory Based Cache Coherence Protocol," Ser. No. 09/652,703, filed Aug. 31, 2000; "Scalable Efficient I/O Port Protocol," Ser. No. 09/652,391, filed Aug. 31, 2000; "Efficient Translation Lookaside Buffer Miss Processing In Computer Systems With A Large Range Of Page Sizes," Ser. No. 09/652,552, filed Aug. 31, 2000; "Fault Containment And Error Recovery Techniques In A Scalable Multiprocessor," Ser. No. 09/651,949, filed Aug. 31, 2000; "Speculative Directory Writes In A Directory Based Cache Coherent Nonuniform Memory Access Protocol," Ser. No. 09/652,834, filed Aug. 31, 2000; "Special Encoding Of Known Bad Data," Ser. No. 09/652,314, filed Aug. 31, 2000; "Broadcast Invalidate Scheme," Ser. No. 09/652,165, filed Aug. 31, 2000; "Mechanism To Track All Open Pages In A DRAM Memory System," Ser. No. 09/652,704, filed Aug. 31, 2000; "Programmable DRAM Address Mapping Mechanism," Ser. No. 09/653,093, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a method and architecture for managing bus usage to maximize system performance while ensuring reliable bus operation. More particularly, the invention relates to an architecture and system which allows for streaming of reads and writes on a bi-directional bus to reduce bus latency thereby increasing system performance, while ensuring no bus contention and no starvation of reads or writes on the bus.

2. Background of the Invention

Computer systems typically incorporate one or more buses to facilitate communication between devices or components in the system. As used herein, a bus is a plurality of wires or conductors to which multiple agents or devices are coupled in order to transport data or signals among and between the agents or devices. A bi-directional bus provides for reads and writes (i.e., communications in both directions) to occur on common wires or conductors. Typically, a bus has a certain protocol which is to be followed by all of the agents coupled to the bus. Having a consistent protocol ensures all agents use the same rules of communication on the bus.

Since a bus is essentially a group of shared conductors or wires, it is important that the agents share the bus in the manner prescribed by the bus protocol. Moreover, it is important that only one agent drive the bus (i.e., issue or place signals on the shared wires of the bus) at a time. When multiple agents attempt to drive the bus at the same time, it is called a bus conflict or bus contention. Bus contention will often result in the signals or data on the bus being corrupted or unreliable and may also result in damage to the agents on the bus.

To avoid bus contention, dead time or "bubbles" may be introduced on the bus between bus transactions. Bubbles ensure the last transaction is complete before the next transaction is attempted. The use and necessity of bubbles is dictated by the bus protocol which may in turn be dictated by the agents or devices connected to the bus. In some bidirectional buses, for example the RAMbus® a standard memory bus, a bubble is only required for transitions from reads to writes or vice versa. In computer systems employing such bidirectional buses, then, the system must incorporate some mechanism to insert bubbles between read/write transitions to ensure that multiple agents connected to the bus do not attempt to simultaneously drive the bus, i.e., and to ensure there is no bus contention. This bubble or delay time between read/write transitions ensures that the previous transaction, either a read or a write, has ended before the next transaction is attempted. Note that for buses of this type, when the same kind of transaction occurs consecutively on the bus (i.e., consecutive reads or consecutive writes), a delay is not required to ensure there will be no bus contention and thus no bubble is added. Bubbles are only introduced when the bus transactions switch from a read to a write or vice versa.

Although bubbles may be necessary to ensure no bus contention, their occurrence should be minimized because the bubbles result in unused bandwidth that would otherwise be useful to the system for enhanced performance. Specifically, the more bubbles that are introduced, the more wait or delay time that is introduced into the system. Accordingly, a system designers desire to maximize bandwidth and system performance is often at odds with the need to ensure avoidance of bus conflicts by adding bubbles.

One method of reducing the number of bubbles, and the associated delays, would be to stream or group reads and writes together whenever possible. Streaming reads and writes consecutively reduces the number of transitions from reads to writes or vice versa, thereby reducing the number of bubbles required. The system used to group like transactions, however, must also ensure that reads and writes are not indefinitely stalled or starved while a stream of the opposite transaction is being performed on the bus. In particular, the system must ensure read/write fairness and avoid starvation for either.

The present invention is directed at an efficient system and architecture to maximize bandwidth and optimize system performance while avoiding bus contention and read/write starvation.

BRIEF SUMMARY OF THE INVENTION

In accordance with the present invention, there is provided a novel system and architecture for intelligently managing reads and writes on a bi-directional bus to optimize bus performance, avoid starvation, and introduce bubbles only when needed to avoid bus contention. This is accomplished by separately queuing reads and writes and then using a simple 2 to 1 multiplexer ("mux") to control the issuance of transactions and bubbles to the bus. The mux is controlled by bus streaming control logic which uses counters, comparators and certain threshold parameters to optimize the system performance by selectively streaming reads and writes together.

The inventive system for managing bidirectional bus usage, comprises: a bi-directional bus; a read queue for pending read bus transactions; a write queue for pending write bus transactions; a mux having a first input coupled to the read queue and a second input coupled to the write queue and an output coupled to the bus; bus streaming control logic coupled to the read queue and the write queue having a first and second control signal coupled to the mux; wherein the bus streaming control logic selectively controls the mux to issue or stream either read transactions from the read queue or write transactions from the write queue to the bus.

In an alternate embodiment of the present invention, the bus streaming control logic of the inventive system further comprises: a first counter to track the number of pending writes in the write queue; a second counter to track the number of consecutive reads issued to the bus; a third counter to track the number of pending reads in the read queue; and a fourth counter to track the number of consecutive writes issued to the bus; as well as a first threshold for pending writes in the write queue; a second threshold for consecutive reads issued to the bus; a third threshold for pending reads in the read queue; and a fourth threshold for consecutive writes issued to the bus.

In an additional alternate embodiment of the present invention, the bus streaming control logic of the inventive system further comprises a plurality of counters to track the number of clock cycles that pending read transactions and write transactions have been waiting in the read queue and the write queue respectively and wherein the bus streaming control logic forces a transition to issue pending transactions which have been waiting for a predetermined amount of time in the queues.

The inventive computer system incorporating the present invention, comprises: a power supply; architecture for managing bi-directional bus usage, comprising: a read queue for pending read bus transactions; a write queue for pending write bus transactions; a mux having a first input coupled to the read queue and a second input coupled to the write queue; bus streaming control logic coupled to the read queue and the write queue having a control signal coupled to the mux; wherein the bus streaming control logic selectively controls the mux to output or stream read transactions from the read queue or write transactions from the write queue.

BRIEF DESCRIPTION OF THE DRAWINGS

The invention can be more fully understood by referencing the accompanying drawings wherein.

NOTATION AND NOMENCLATURE

Figure 1:
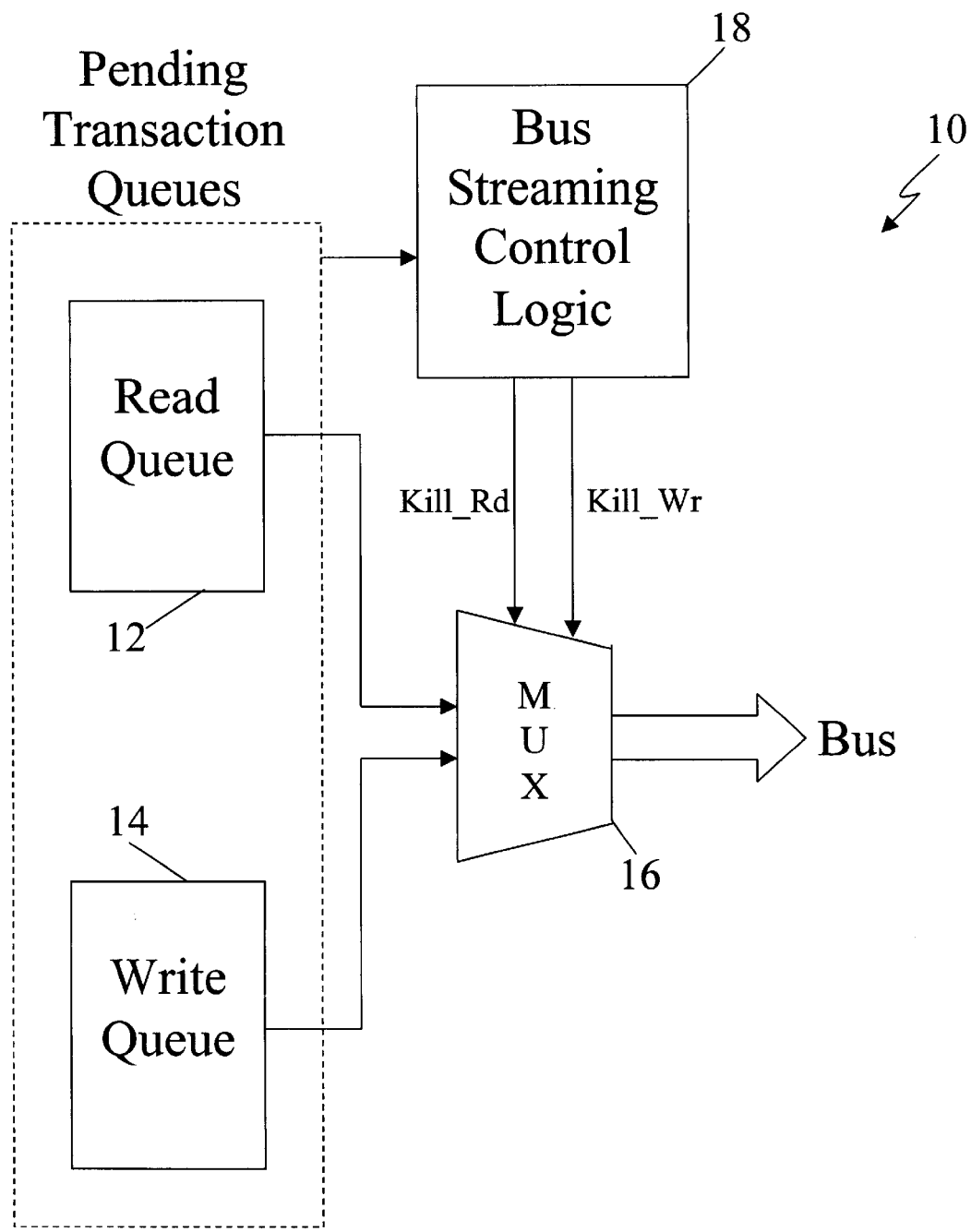
FIG. 1 shows a functional block diagram of the architecture 10 for managing bus transactions as contemplated by the present invention.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE DRAWINGS

Referring now to the drawings, wherein like reference characters denote corresponding components or parts:

FIG. 1 shows a functional block diagram of the system and architecture 10 for efficiently managing bus traffic as contemplated by the present invention. Reads and writes set for issuance to the bus are queued in a separate read queue 12 and write queue 14. These queues are collectively referred to herein as pending transaction queues 12, 14. Each queue 12, 14 is coupled to a multiplexer 16 or any other switch (collectively referred to herein as a "mux"). The output of the mux 16 is issued to the bus.

Bus streaming control logic 18 is coupled to the pending transaction queues 12, 14 to track or monitor the state of the read queue 12 and write queue 14. The bus streaming control logic 18 is coupled to the mux 16 via control signals Kill_Rd and Kill_Wr as shown. When the bus streaming control logic 18 asserts the Kill_Rd signal to the mux 16, all reads are blocked by the mux 16 and the mux 16 will only issue writes from the write queue 14 to the bus. When the bus streaming control logic 18 asserts the Kill_Wr signal, all writes are blocked by the mux 16 and the mux 16 will only issue reads from the read queue 12 to the bus. When both control signals are asserted, neither reads nor writes will be issued to the bus causing a bubble or delay on the bus. Of course if there are no pending transactions in queue, the bus will also be inactive. For example, if Kill_Rd is asserted and Kill_Wr is not asserted, there may still be a delay or bubble if there are no writes pending in the write queue 14. Similarly, if Kill_Wr is asserted and Kill_Rd is not asserted, there may still be a delay or bubble if there are no reads pending in the read queue 12. The bus streaming control logic 18 utilizes counters, comparators and threshold parameters to selectively control the streaming of the reads, writes and bubbles to the bus. In the preferred embodiment of the computer system incorporating the present invention, the bus streaming control logic 18 is in the Middle Mapper/Slotter of the Zbox as described in the applications incorporated herein by reference only.

The system and architecture 10 as contemplated by the present invention may be more fully understood by discussing an example of its operation. Reads and writes arrive at the pending transaction queues 12, 14 ready for issuance to the bus. Bus streaming control logic 18 uses a counter to track the number of pending reads in the read queue 12 (a "pending read counter") and a counter to track the number of pending writes in the write queue 14 (a "pending write counter"). When a stream of reads is being performed on the bus, the bus streaming control logic 18 compares the number of pending writes to a first threshold parameter. When the number of pending writes in the write queue 14 reaches the threshold number, the system is said to become "hungry" for writes and a transition from reads to writes is desired. Although the transition could be effectuated immediately by the bus streaming control logic 18, in the preferred embodiment of the invention an additional criteria must be met before a transition is instituted. In particular, when the system becomes hungry for writes, the bus streaming control logic 18 starts another counter to track the number of consecutive reads issued (an "issued reads counter"). The bus streaming control logic 18 then compares the number of issued reads to a second threshold parameter. This second threshold parameter ensures that a sufficient stream of reads has been issued before a transition occurs. When the number of issued reads reaches the second threshold number, the system is said to be "starved" for writes and a transition from reads to writes is executed.

The control signals Kill_Rd and Kill_Wr are used to execute a transition from reads to writes. Since only reads are currently being issued to the bus, the Kill_Wr signal is already asserted to the mux 16. The bus streaming control logic 18 then asserts the Kill_Rd signal to stop all reads and writes from issuance to the bus. With both control signals asserted, the mux 16 prevents any reads or writes from issuance to the bus and a bubble is implemented on the bus (i.e., no reads or writes are issued). After a predetermined amount of time elapses, based on the necessary delay time required by the bus protocol, the bus streaming control logic 18 unasserts the Kill_Wr signal. With only the Kill_Rd signal asserted, the mux 16 begins to issue writes from the write queue 14 to the bus and the transition from reads to writes is complete.

Transitions from writes to reads are similarly handled. When a stream of writes is being performed on the bus, the bus streaming control logic 18 compares the number of pending reads to a third threshold parameter. When the number of pending reads in the read queue 14 reaches the threshold number, the system is said to become "hungry" for reads and a transition from writes to reads is desired. Although the transition could be effectuated immediately by the bus streaming control logic 18, in the preferred embodiment of the invention an additional criteria must be met before a transition is instituted. In particular, when the system becomes hungry for reads, the bus streaming control logic 18 starts another counter to track the number of consecutive writes issued (an "issued writes counter"). The bus streaming control logic 18 then compares the number of issued writes to a fourth threshold parameter. This fourth threshold parameter ensures that a sufficient stream of writes has been issued before a transition occurs. When the number of issued writes reaches the fourth threshold number, the system is said to be "starved" for reads and transition from writes to reads is executed.

The control signals Kill_Rd and Kill_Wr are also used to execute a transition from reads to writes. Since only writes are being issued to the bus, the Kill_Rd signal is already asserted to the mux 16. The bus streaming control logic 18 then asserts the Kill_Wr signal to stop all writes and reads from issuance to the bus. With both control signals asserted, the mux 16 prevents any reads or writes from issuance to the bus and a bubble is implemented on the bus (i.e., no reads or writes are issued). After a predetermined amount of time elapses, based on the necessary delay time required by the bus protocol, the bus streaming control logic 18 unasserts the Kill_Rd signal. With only the Kill_Wr signal asserted, the mux 16 begins to issue reads from the read queue 12 to the bus and the transition from writes to reads is complete.

In order to accomplish this control of the bus usage, 4 counters and 4 threshold parameters have been used as follows:

| Counters | Thresholds (setting in preferred embodiment) |
| --- | --- |
| 1. number of pending writes | 1. threshold for pending writes (4) |
| 2. number of consecutive reads | 2. threshold for consecutive reads (8) |
| 3. number of pending reads | 3. threshold for pending reads (1) |
| 4. number of consecutive writes | 4. threshold for consecutive writes (8) |

As discussed above, counters 1 and 3 continuously track and monitor the number of writes and reads pending in the write queue 14 and read queue 12, respectively. When counter 1 reaches the threshold 1 for pending writes, the system becomes hungry for writes and counter 2 is started to track the number of consecutive reads executed. When counter 2 reaches threshold 2 for consecutive reads issued, the system is starved for writes and a transition from reads to writes occurs. Similarly, when counter 3 reaches the threshold 3 for pending reads, the system becomes hungry for reads and counter 4 is started to track the number of consecutive writes executed. When counter 4 reaches threshold 4 for consecutive writes issued, the system is starved for reads and transition from writes to reads occurs.

The threshold parameters can be predetermined or programmable. Values for the parameters should be set to optimize system performance. Optimal values for the parameters will depend on the system. In the preferred embodiment of the invention, the parameters are set as shown above. The threshold for pending reads is set to 1 and the threshold for pending writes is set to 4. This effectively gives a priority to reads since the system will become hungry for reads as soon as one read is pending in the read queue 12 (whereas four writes must be pending before the system becomes hungry for writes). These settings were used because in the computer system of the preferred embodiment, system latency was more dependent on reads being delayed than writes. For any system where this is true, a similar preference for reads may be integrated in the threshold parameters. The thresholds for consecutive reads and writes were both set to 8 in the preferred embodiment because the read queue 12 and write queue 14 have 8 entries. Accordingly, when the system becomes hungry for a transition, one complete cycle through the queue is completed before the transition is allowed to take place. It is understood that one of the advantages of the invention is the ability to tune these parameters to maximize system performance. Accordingly, threshold parameters different than those used in the preferred embodiment may provide optimal performance in any given system.

It should be noted that in the discussion of the present invention to this point, there is the potential for a problem.

In particular, when thresholds 1 or 3 are set to a number greater than 1, there is the potential for a read or write to become stranded in the pending transaction queues 12, 14 (i.e., real or complete starvation of a read or write). For instance, if a stream of reads is being executed in the preferred embodiment (where threshold 1 for pending writes is set to 4), when a write arrives at the write queue 14, it must wait until 4 writes have accumulated in the queue before the system will become hungry and begin counting the consecutive reads issued. If no other writes are forthcoming, the write could remain stranded in the write queue 14 indefinitely.

Obviously, indefinitely delaying a pending transaction could introduce additional and indefinite latency in the system as a whole. To avoid this possibility, an additional counter can be used to track the number of clock cycles a transaction has been waiting in the pending transaction queues 12, 14 and to ensure the transactions do not wait indefinitely for a transition. Specifically, in the preferred embodiment a counter is started when the first write enters the write queue 14. The counter is incremented each clock cycle to track the amount of time the write has been waiting. If a transition has not been completed in a predetermined amount of time, i.e., before the counter reaches a predetermined value, then the system is forced to become hungry for writes (as if 4 writes had accumulated in the write queue 14). Accordingly, the counter 2 for consecutive reads is started and a transition occurs when it reaches the threshold 2 for consecutive reads. This assures that the write will not remain in the queue indefinitely waiting for 4 writes to accumulate. Such a counter is not required for reads in the preferred embodiment because the threshold for reads is set to 1, meaning the system becomes hungry for reads as soon as a read enters the read queue 12. Similar counters should be used if the thresholds 1 or 3 are set greater than 1 in order to ensure there is not indefinite starvation of reads or writes.

Figure 2:
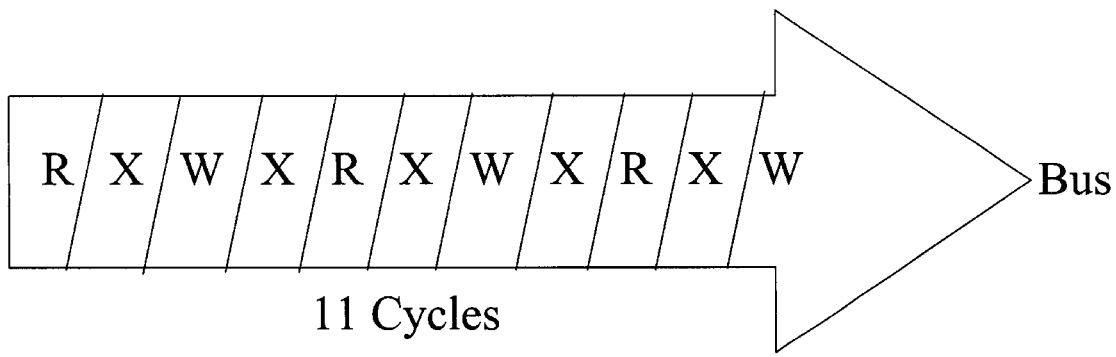
FIG. 2 illustrates read/write transactions issued on a bus prior to the present invention.
Figure 3:
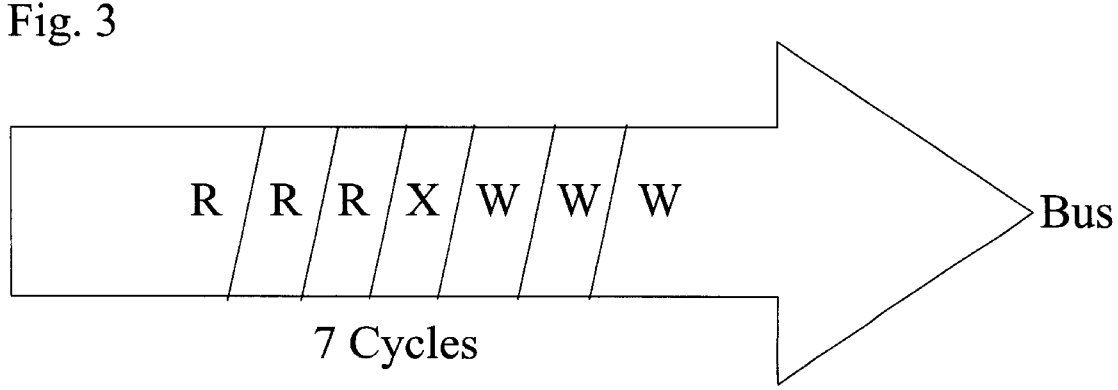
FIG. 3 illustrates read/write transactions issued on a bus as contemplated by the present invention.

FIG. 2 and FIG. 3 attempt to illustrate the increased performance realized by the present invention. FIG. 2 illustrates reads and writes indiscriminately issued on a bus as would often occur prior to the present invention. In FIG. 2, reads are represented by an R on the bus and writes are represented by a W. Between each transition from read to write or vice versa, a bubble or delay is inserted to ensure there is no bus contention. Bubbles are represented by an X. In the example illustrated in FIG. 2, there are three reads and three writes being issued on the bus. Because the reads and writes are interspersed, however, several bubbles are required between the read/write transitions. Assuming each read, write and bubble takes a clock cycle, 11 cycles are required to issue the three reads and three writes as illustrated in FIG. 2.

FIG. 3 illustrates reads and writes issued on a bus as contemplated by the present invention. In particular, three reads and three writes are also depicted on the bus in FIG. 3. The reads and writes in FIG. 3, however, are streamed or grouped together as opposed to intermingled as shown in FIG. 2. The result is that only one bubble is required since there is only one transition between reads and writes. Accordingly, only 7 cycles are required to issue three reads and three writes (again assuming each read, write and bubble takes one clock cycle). Thus, by grouping or streaming the reads and writes, 4 cycles were saved from the example in FIG. 2. The invention streams the reads and writes to allow more transactions to occur on the bus with less bubbles or latency. The result is increased system performance.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. A system for managing bi-directional bus usage, comprising:

a bi-directional bus;

a read queue for pending read bus transactions;

a write queue for pending write bus transactions;

a mux having a first input coupled to said read queue and a second input coupled to said write queue and an output coupled to said bus;

bus streaming control logic coupled to said read queue and said write queue having at least one control signal coupled to said mux;

wherein said bus streaming control logic selects for issuance to the bus either read transactions from said read queue or write transactions from said write queue to reduce the number of transitions between read transactions and write transactions;

wherein said bus streaming control logic uses a first control signal and a second control signal to selectively control the mux to output either read transactions from said read queue or write transactions from said write queue to said bus; and wherein said bus streaming control logic transitions from read transactions to write transactions by first asserting said first control signal to said mux in order to stop said read transactions and then unasserts said second control signal to said mux in order to enable said write transactions from said write queue to said bus.

2. The system of claim 1 wherein said bus streaming control logic delays between asserting said first control signal and unasserting said second control signal in order to issue a bubble to said bus to avoid bus contention.

3. The system of claim 1 wherein said bus streaming control logic delays for a predetermined amount of time between asserting said first control signal and unasserting said second control signal in order to issue a bubble of predetermined duration to said bus to avoid bus contention.

4. A system for managing bi-directional bus usage, comprising:

a bi-directional bus;

a read queue for pending read bus transactions;

a write queue for pending write bus transactions;

a mux having a first input coupled to said read queue and a second input coupled to said write queue and an output coupled to said bus;

bus streaming control logic coupled to said read queue and said write queue having at least one control signal coupled to said mux;

wherein said bus streaming control logic selects for issuance to the bus either read transactions from said read queue or write transactions from said write queue to reduce the number of transitions between read transactions and write transactions;

wherein said bus streaming control logic uses a first control signal and a second control signal to selectively control the mux to output either read transactions from said read queue or write transactions from said write queue to said bus; and wherein said bus streaming control logic transitions from write transactions to read transactions by first asserting said second control signal to said mux in order to stop said write transactions and then unasserts said first control signal to said mux in order to enable said read transactions from said read queue to said bus.

5. The system of claim 4 wherein said bus streaming control logic delays between asserting said second control signal and unasserting said first control signal in order to issue a bubble to said bus to avoid bus contention.

6. The system of claim 4 wherein said bus streaming control logic delays for a predetermined amount of time between asserting said second control signal and unasserting said first control signal in order to issue a bubble of predetermined duration to said bus to avoid bus contention.

7. A system for managing bi-directional bus usage, comprising:
   a bi-directional bus;
   a read queue for pending read bus transactions;
   a write queue for pending write bus transactions;
   a mux having a first input coupled to said read queue and a second input coupled to said write queue and an output coupled to said bus;
   bus streaming control logic coupled to said read queue and said write queue having at least one control signal coupled to said mux;
   wherein said bus streaming control logic selects for issuance to the bus either read transactions from said read queue or write transactions from said write queue to reduce the number of transitions between read transactions and write transactions; and
   wherein said bus streaming control logic further comprises:
      a first counter to track the number of pending writes in said write queue;
      a second counter to track the number of consecutive reads issued to said bus;
      a third counter to track the number of pending reads in said read queue; and
      a fourth counter to track the number of consecutive writes issued to said bus.

8. The system of claim 7 wherein said bus streaming control logic further comprises:
   a first threshold for pending writes in said write queue;
   a second threshold for consecutive reads issued to said bus;
   a third threshold for pending reads in said read queue; and
   a fourth threshold for consecutive writes issued to said bus.

9. The system of claim 8 wherein the first, second, third and fourth thresholds are predetermined values.

10. The system of claim 8 wherein the first, second, third and fourth thresholds are programmable values.

11. The system of claim 8 wherein said bus streaming control logic transitions from read transactions to write transactions when said first counter reaches said first threshold and said second counter reaches said second threshold.

12. The system of claim 8 wherein said bus streaming control logic transitions from write transactions to read transactions when said third counter reaches said third threshold and said fourth counter reaches said fourth threshold.

13. The system of claim 8 wherein said first counter continuously tracks the number of pending writes in said write queue; said second counter starts to track the number of consecutive reads issued to said bus when said first counter reaches said first threshold; said third counter continuously tracks the number of pending reads in said read queue; and said fourth counter starts to track the number of consecutive writes issued to said bus when said third counter reaches said third threshold.

14. A system for managing bi-directional bus usage, comprising:
   a bidirectional bus;
   a read queue for pending read bus transactions;
   a write queue for pending write bus transactions;
   a mux having a first input coupled to said read queue and a second input coupled to said write queue and an output coupled to said bus;
   bus streaming control logic coupled to said read queue and said write queue having at least one control signal coupled to said mux;
   wherein said bus streaming control logic selects for issuance to the bus either read transactions from said read queue or write transactions from said write queue to reduce the number of transitions between read transactions and write transactions; and
   wherein said bus streaming control logic further comprises a plurality of counters to track the number of clock cycles pending read transactions and write transactions have been waiting in said read queue and said write queue respectively and wherein said bus streaming control logic forces a transition to issue pending transactions which have been waiting for a predetermined amount of time in said queues.

15. A method of managing bi-directional bus usage, comprising the steps of:
   using a pending write counter to track the number of pending writes in a write queue;
   using a pending read counter to track the number of pending reads in a read queue;
   transitioning from write transactions to read transactions when said pending write counter reaches a threshold value;
   transitioning from read transactions to write transactions when said pending read counter reaches a threshold value;
   wherein the transitioning from read transactions to write transactions comprises:
      asserting a first control signal to a mux in order to stop said read transactions from said read queue;
      delaying a determined amount of time; and
      unasserting a second control signal to a mux in order to enable said write transactions from said write queue.

16. A method of managing bi-directional bus usage, comprising the steps of:
   using a pending write counter to track the number of pending writes in a write queue;
   using a pending read counter to track the number of pending reads in a read queue;
   transitioning from write transactions to read transactions when said pending write counter reaches a threshold value;
   transitioning from read transactions to write transactions when said pending read counter reaches a threshold value;
   wherein the transitioning from write transactions to read transactions comprises:
      asserting a second control signal to a mux in order to stop said write transactions from said write queue;

delaying a determined amount of time; and asserting a first control signal to a mux in order to enable said read transactions from said read queue.

17. A method of managing bi-directional bus usage, comprising the steps of:

using a pending write counter to track the number of pending writes in a write queue;

using a pending read counter to track the number of pending reads in a read queue;

transitioning from write transactions to read transactions when said pending write counter reaches a threshold value;

transitioning from read transactions to write transactions when said pending read counter reaches a threshold value;

using an issued reads counter to track the number of consecutive reads issued from said read queue;

using an issued writes counter to track the number of consecutive writes issued from said write queue;

transitioning from write transactions to read transactions when said pending write counter reaches a first threshold value and said issued reads counter reaches a second threshold; and transitioning from read transactions to write transactions when said pending read counter reaches a third threshold value and said issued writes counter reaches a fourth threshold.

18. A system for managing bi-directional bus usage, comprising:

a bi-directional bus;

a read queue for pending read bus transactions;

a write queue for pending write bus transactions;

a mux having a first input coupled to said read queue and a second input coupled to said write queue and an output coupled to said bus;

bus streaming control logic coupled to said read queue and said write queue having a first and second control signal coupled to said mux;

wherein said bus streaming control logic uses said first and second control signals to selectively control the mux to output either read transactions from said read queue or write transactions from said write queue to said bus; and wherein said bus streaming control logic transitions from read transactions to write transactions by first asserting said first control signal to said mux in order to stop said read transactions and then unasserts said second control signal to said mux in order to enable said write transactions from said write queue to said bus.

19. The system of claim 18 wherein said bus streaming control logic delays between asserting said first control signal and unasserting said second control signal in order to issue a bubble to said bus to avoid bus contention.

20. The system of claim 18 wherein said bus streaming control logic delays for a predetermined amount of time between asserting said first control signal and unasserting said second control signal in order to issue a bubble of predetermined duration to said bus to avoid bus contention.

21. A system for managing bi-directional bus usage, comprising:

a bi-directional bus;

a read queue for pending read bus transactions;

a write queue for pending write bus transactions;

a mux having a first input coupled to said read queue and a second input coupled to said write queue and an output coupled to said bus;

bus streaming control logic coupled to said read queue and said write queue having a first and second control signal coupled to said mux;

wherein said bus streaming control logic uses said first and second control signals to selectively control the mux to output either read transactions from said read queue or write transactions from said write queue to said bus; and wherein said bus streaming control logic transitions from write transactions to read transactions by first asserting said second control signal to said mux in order to stop said write transactions and then unasserts said first control signal to said mux in order to enable said read transactions from said read queue to said bus.

22. The system of claim 21 wherein said bus streaming control logic delays between asserting said second control signal and unasserting said first control signal in order to issue a bubble to said bus to avoid bus contention.

23. The system of claim 21 wherein said bus streaming control logic delays for a predetermined amount of time between asserting said second control signal and unasserting said first control signal in order to issue a bubble of predetermined duration to said bus to avoid bus contention.

24. A system for managing bi-directional bus usage, comprising:

a bi-directional bus;

a read queue for pending read bus transactions;

a write queue for pending write bus transactions;

a mux having a first input coupled to said read queue and a second input coupled to said write queue and an output coupled to said bus;

bus streaming control logic coupled to said read queue and said write queue having a first and second control signal coupled to said mux;

wherein said bus streaming control logic selectively controls the mux to issue either read transactions from said read queue or write transactions from said write queue to said bus; and wherein said bus streaming control logic further comprises a plurality of counters to track the number of clock cycles pending read transactions and write transactions have been waiting in said read queue and said write queue respectively and wherein said bus streaming control logic forces a transition to issue pending transactions which have been waiting for a predetermined amount of time in said queues.

25. A method of managing bi-directional bus usage, comprising:

selecting pending read or write transactions from a read queue and write queue for issuance to a bus to reduce the number of transitions between read transactions and write transactions on the bus;

wherein the selecting pending read or write transactions comprises using a first control signal and a second control signal to selectively control a mux to output either read transactions from a read queue or write transactions from a write queue to a bus; and wherein the using a first control signal and a second control signal comprises:

asserting the first control signal to said mux in order to stop read transactions from the read queue to said bus; and asserting the second control signal to said mux in order to stop write transactions from the write queue to said bus.

26. A method of managing bi-directional bus usage, comprising:

selecting pending read or write transactions from a read queue and write queue for issuance to a bus to reduce the number of transitions between read transactions and write transactions on the bus;

wherein the selecting pending read or write transactions comprises using a first control signal and a second control signal to selectively control a mux to output either read transactions from a read queue or write transactions from a write queue to a bus; and further comprising transitioning from read transactions to write transactions by asserting the first control signal to said mux in order to stop said read transactions from said read queue and then unasserting the second control signal to said mux in order to enable said write transactions from said write queue.

27. The method of claim 26 further comprising:

delaying a determined amount of time between asserting the first control signal and unasserting the second control signal.

28. A method of managing bi-directional bus usage, comprising:

selecting pending read or write transactions from a read queue and write queue for issuance to a bus to reduce the number of transitions between read transactions and write transactions on the bus;

wherein the selecting pending read or write transactions comprises using a first control signal and a second control signal to selectively control a mux to output either read transactions from a read queue or write transactions from a write queue to a bus; and further comprising transitioning from write transactions to read transactions by asserting the second control signal to said mux in order to stop said write transactions from said write queue, and then unasserting the first control signal to said mux in order to enable said read transactions from said read queue.

29. The method of claim 28 further comprising:

delaying a determined amount of time between asserting the second control signal and unasserting the first control signal.

30. A method of managing bi-directional bus usage, comprising:

selecting pending read or write transactions from a read queue and write queue for issuance to a bus to reduce the number of transitions between read transactions and write transactions on the bus; and wherein the step of selecting pending read or write transactions comprises:

counting the number of pending write transactions in the write queue;

counting the number of pending read transactions in the read queue;

counting the number of consecutive read transactions issued to the bus;

counting the number of consecutive write transactions issued to the bus;

transitioning from write transactions to read transactions when the number of pending write transactions reaches a first threshold value and the number of consecutive reads reaches a second threshold value; and transitioning from read transactions to write transactions when the number of pending read transactions reaches a third threshold value and the number of consecutive writes reaches a fourth threshold value.

31. The method of claim 30 wherein the counting the number of consecutive read and write transactions issued comprises:

counting the number of consecutive read transactions issued to the bus once the number of pending write transactions reaches the first threshold value; and counting the number of consecutive write transactions issued to the bus once the number of pending read transactions reaches the third threshold value.

32. A method of managing bi-directional bus usage, comprising:

selecting pending read or write transactions from a read queue and write queue for issuance to a bus to reduce the number of transitions between read transactions and write transactions on the bus; and tracking the time that pending read transactions and write transactions have been waiting in the read queue and write queue respectively and forcing a transition to issue pending transactions which have been waiting for a determined amount of time in the queues.

* * * * *